United States Patent
Mondello et al.

(10) Patent No.: US 12,120,221 B2
(45) Date of Patent: Oct. 15, 2024

(54) REMOTELY MANAGING DEVICES USING BLOCKCHAIN AND DICE-RIOT

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 129 days.

(21) Appl. No.: 17/469,067

(22) Filed: Sep. 8, 2021

(65) Prior Publication Data
US 2021/0409201 A1 Dec. 30, 2021

Related U.S. Application Data

(63) Continuation of application No. 16/363,295, filed on Mar. 25, 2019, now Pat. No. 11,128,451.

(51) Int. Cl.
*H04L 9/08* (2006.01)
*H04L 9/06* (2006.01)
(Continued)

(52) U.S. Cl.
CPC .......... *H04L 9/0847* (2013.01); *H04L 9/0637* (2013.01); *H04L 9/0866* (2013.01); *H04L 12/2816* (2013.01); *H04L 41/28* (2013.01)

(58) Field of Classification Search
CPC ... H04L 9/0847; H04L 9/0637; H04L 9/0866; H04L 12/2816; H04L 41/28
See application file for complete search history.

(56) References Cited

U.S. PATENT DOCUMENTS 9,871,772 B1   1/2018  Weinstein et al.
9,906,924 B2 *  2/2018  Azmat .................... H04W 4/08
(Continued)

FOREIGN PATENT DOCUMENTS

CN    202022184 U  * 11/2011
CN    103944734      7/2014
(Continued)

OTHER PUBLICATIONS

International Search Report and Written Opinion, PCT/US2020/021116, mailed Jun. 26, 2020.
(Continued)

*Primary Examiner* — Hee K Song
(74) *Attorney, Agent, or Firm* — Greenberg Traurig

(57) ABSTRACT

Disclosed are techniques for remotely managing computing devices using blockchain and DICE-RIoT. In one embodiment, a method is disclosed comprising scanning a network to obtain a list of devices on the network; classifying the devices as either controlled, uncontrolled or restricted devices; establishing a secure channel with the controlled devices; issuing one or more control commands to the controlled devices over the secure channel, the one or more control commands included within a signed message, the signed message signed using a private key of the sender and verified using a public key of the receiver, the private key and public key generated during the establishing of the secure channel; receiving a response to the control commands; and logging the control commands and the response in a blockchain.

20 Claims, 7 Drawing Sheets

(51) Int. Cl.
*H04L 12/28* (2006.01)
*H04L 41/28* (2022.01)

(56) References Cited

U.S. PATENT DOCUMENTS

| | | |
|---|---|---|
| 11,128,451 B2 | 9/2021 | Mondello et al. |
| 2003/0093669 A1 | 5/2003 | Morais et al. |
| 2008/0301441 A1 | 12/2008 | Calman et al. |
| 2013/0268357 A1 | 10/2013 | Heath |
| 2014/0033288 A1 | 1/2014 | Wynn et al. |
| 2014/0240753 A1 | 8/2014 | Anno et al. |
| 2016/0072630 A1 | 3/2016 | Ujiie et al. |
| 2016/0205747 A1 | 7/2016 | Verbrugh et al. |
| 2017/0026183 A1 | 1/2017 | Strong et al. |
| 2018/0159692 A1 | 6/2018 | Strong et al. |
| 2018/0254905 A1 | 9/2018 | Chun |
| 2018/0375870 A1 | 12/2018 | Bernsen |
| 2019/0042779 A1 | 2/2019 | Agerstam et al. |
| 2019/0044815 A1 | 2/2019 | Rosh et al. |
| 2019/0044820 A1 | 2/2019 | Rosh et al. |
| 2019/0052461 A1 | 2/2019 | Kreder, III et al. |
| 2019/0207760 A1 | 7/2019 | Hennebert |
| 2019/0378352 A1* | 12/2019 | Dey .............. G07C 5/008 |
| 2020/0007511 A1 | 1/2020 | Van De Groenendaal et al. |
| 2020/0128088 A1 | 4/2020 | Badyan et al. |
| 2020/0313877 A1 | 10/2020 | Mondello et al. |

FOREIGN PATENT DOCUMENTS

| | | | |
|---|---|---|---|
| CN | 108305072 | 7/2018 | |
| CN | 109492352 | 3/2019 | |
| DE | 10121819 | 11/2002 | |
| JP | 2003283489 | 10/2003 | |
| WO | 0130044 A2 | 4/2001 | |
| WO | 2005024598 A2 | 3/2005 | |
| WO | WO-2020074934 A1 * | 4/2020 | .............. G07C 9/22 |
| WO | WO-2020160789 A1 * | 8/2020 | ........... H04L 9/3239 |

OTHER PUBLICATIONS

TCG Published, "Hardware Requirements for a Device Identifier Composition Engine, Family '2.0', Level 00 Revision 78." Trusted Computing Group, Mar. 22, 2018.
TCG Published, "Implicit Identity Based Device Attestation, Version 1.0, Revision 0.93." Trusted Computing Group, Mar. 5, 2018.
Aigner, Ronald, et al., "Device Identity with DICE and RIoT: Keys and Certificates (Draft for Review)." Retrieved from the Internet on Jul. 9, 2019 <hrrps://www.microsoft.com/en-us/research/wp-content/uploads/2017/09/KeysAndCertificatesForDiceAndRIoT-v3-2.docx>, Microsoft Corporation, Sep. 1, 2017.
Extended European Search Report, EP20777542.0, mailed on Nov. 21, 2022.
Microsoft, "DICE: Device Identifier Composition Engine." Microsoft, Jan. 1, 2015.

* cited by examiner

REMOTELY MANAGING DEVICES USING BLOCKCHAIN AND DICE-RIOT

CROSS-REFERENCE TO RELATED APPLICATIONS

The present application is a continuation application of U.S. patent application Ser. No. 16/363,295 filed Mar. 25, 2019, the entire disclosures of which application are hereby incorporated herein by reference.

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments are directed toward computer security and, specifically, to devices, computer-readable media, and methods for remotely managing computing devices using blockchain and DICE-RIoT.

There are different contexts where is important, for safety reasons, that an authority is able to regulate the functionality of some connected devices (e.g., instruments, phones, laptop etc.). For example, in a hospital the functionality of devices in an intensive care unit and operating rooms and the functionality of specific device such as laboratory equipment, hyperbaric chambers, etc. must be heavily regulated. As another example, during an emergency an authority may need to limit the usage of devices to have bandwidth for emergency relief.

To improve the safety of risky environments it is important to have direct control of connected electronic equipment present in some areas. However, requiring that individuals (and thus individual devices) execute this control presents significant security concerns. Currently two techniques are used to allegedly compensate for requiring individual control of other devices.

In one scenario, user devices are coercively controlled. That is, users are forced to submit to a central authority (e.g., turn off mobile phones etc.) under threat of negative action. For instance, during air travel, users are legally required to shut off cell phones and other wireless devices under threat of removal from an aircraft or civil penalties.

In a second scenario, a user willingly grants management of a device to a remote entity. For example, a user may accept that the user's employer may access their device and install/remove applications, control settings etc. via provisioning profiles. In some embodiments, these schemes may be limited in the geographic area in which control can be exerted or in the type of control exerted.

These systems suffer from numerous deficiencies. In the first scenario, users simply may not comply, thus frustrating the purpose of the control. Indeed, since the scenario is not implemented technically, there is no way to confirm compliance without manually checking each device. In second system, users generally must have a relationship with the controlling entity (e.g., employer-employee) and must affirmatively agree to be controlled. Thus, in public scenarios this solution is technically impossible. Further, a user may utilize a different device that is not under control, thus frustrating purpose.

Thus, there exists a need in the art for a way to remotely manage an electronic device that does not rely on user intervention. Additionally, to implement such a technical solution, there exists a need to ensure that a controlling device can reliably be identified as a device having appropriate authority.

SUMMARY

Disclosed herein are methods, computer-readable media, and devices for remotely managing computing devices using blockchain and DICE-RIoT.

In one embodiment, a method is disclosed comprising scanning a network to obtain a list of devices on the network; classifying the devices as either controlled or uncontrolled devices; establishing a secure channel with the controlled devices; issuing one or more control commands to the controlled devices over the secure channel, the one or more control commands included within a signed message, the signed message signed using a private key of the sender and verified using a public key of the receiver, the private key and public key generated during the establishing of the secure channel; receiving a response to the control commands; and logging the control commands and the response in a blockchain.

In another embodiment, a non-transitory computer readable storage medium for tangibly storing computer program instructions capable of being executed by a computer processor is disclosed, the computer program instructions defining the steps of: scanning a network to obtain a list of devices on the network; classifying the devices as either controlled, uncontrolled, or restricted devices; establishing a secure channel with the controlled devices; issuing one or more control commands to the controlled devices over the secure channel, the one or more control commands included within a signed message, the signed message signed using a private key of the sender and verified using a public key of the receiver, the private key and public key generated during the establishing of the secure channel; receiving a response to the control commands; and logging the control commands and the response in a blockchain.

In another embodiment, a device is disclosed comprising: a processor; and a storage medium for tangibly storing thereon program logic for execution by the processor, the stored program logic comprising: logic, executed by the processor, for scanning a network to obtain a list of devices on the network; logic, executed by the processor, for classifying the devices as either controlled, uncontrolled, or restricted devices; logic, executed by the processor, for establishing a secure channel with the controlled devices; logic, executed by the processor, for issuing one or more control commands to the controlled devices over the secure channel, the one or more control commands included within a signed message, the signed message signed using a private key of the sender and verified using a public key of the receiver, the private key and public key generated during the establishing of the secure channel; logic, executed by the processor, for receiving a response to the control commands; and logic, executed by the processor, for logging the control commands and the response in a blockchain.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
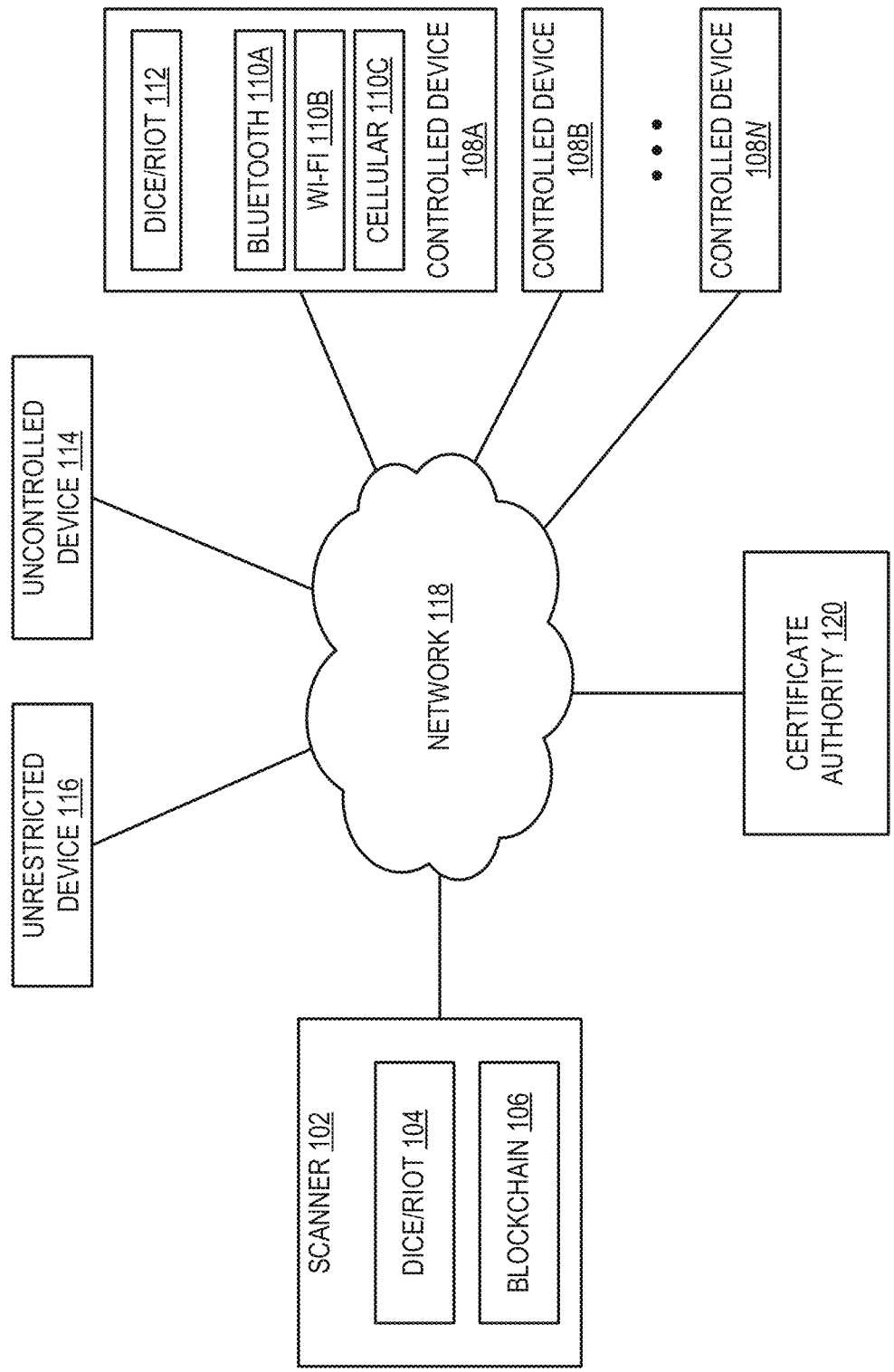
FIG. 1 is a block diagram of a system for managing remote devices according to one embodiment of the disclosure.

FIG. 1 is a block diagram of a system for managing remote devices according to one embodiment of the disclosure.

In the illustrated embodiment, a network (118) connects a scanner (102), devices (108A, 108B, . . . 108N), certificate authority (120), unrestricted devices (116), and uncontrolled devices (114). In one embodiment, the network (118) can comprise multiple different networks such as a Wi-Fi network, cellular network, personal area network (e.g., Bluetooth), near-field communication (NFC) network, and any other network.

In one embodiment, scanner (102) comprises a device that is designed to control one or more devices. As one example, scanner (102) comprises a hardware module or standalone device placed in a closed area requiring control. For example, the scanner (102) may comprise a device attached to an x-ray machine at an airport, in a hospital laboratory, an airplane cabin, or other area where control over electronic devices are present.

The scanner (102) includes a DICE/RIoT subsystem (104) and a blockchain module (106). In one embodiment, the DICE/RIoT subsystem (104) comprises an $L_0$ and $L_1$ DICE/RIoT subsystem that generates a layer 1 public key, device identifier, and certificate as will be described herein. The DICE/RIoT subsystem (104) can comprise a combination of firmware (ROM) code, and upper layer software. The operation of the DICE/RIoT subsystem (104) is described more fully in connection with FIG. 4, incorporated herein by reference in its entirety.

The scanner (102) additionally includes a blockchain module (106). In one embodiment, the blockchain module (106) is responsible for the actual storage of blockchain data (illustrated in FIG. 5) as well as performing all blockchain operations (e.g., block validation, consensus etc.). As will be described, blockchain module (106) provides for a tamper-proof record of instructions sent to devices (108A, 108B, . . . 108N) and how those devices reacted to the instructions.

Devices (108A, 108B, . . . 108N) are referred to as controlled devices since they are capable of being controlled by the scanner (102). In one embodiment, a device is controllable if it contains a DICE/RIoT subsystem (112). As will be described in FIG. 4, the presence of a DICE/RIoT subsystem allows the controlled devices to verify the identity of the scanner and also generate their own verifiable identifies that can be used to mutually acknowledge that each device (scanner and controlled device) is who they say they are. As illustrated, each controlled device includes a variety of standard network interfaces (110A, 110B, 110C). These interfaces operate as standard interfaces and enable the controlled devices (108A, 108B, . . . 108N) to communicate with the scanner (102) via various networks.

In addition to controlled devices, the Figure illustrates unrestricted devices (116) and uncontrolled devices (114). In the illustrated embodiment, an unrestricted device may have a DICE/RIoT subsystem (or may not) but is otherwise exempt from control. In one embodiment, an unrestricted device has a triple that is recorded as a known unrestricted device and thus scanner (102) ignores such a device when attempting to control devices within its coverage area. One example of an unrestricted device comprises telecommunications equipment (e.g., routers, etc.) that may be present in the area covered by the scanner.

In contrast to unrestricted devices (116), an uncontrolled device (114) is one that does not include a DICE/RIoT subsystem. Since this subsystem is missing, uncontrolled device (114) cannot verify the identity of the scanner (102) and thus will not respond to commands to control the device (for security purposes). For these devices, the system may fall back to existing methods of controlling devices (discussed previously). Notably, while DICE/RIoT is discussed primarily in the specification, other authentication schemes may be used provided they meet the requirements described herein.

Finally, the system illustrates a certificate authority (120). This certificate authority (120) comprises a trusted entity that can sign certificates generated by the scanner (102) or controlled devices (108A, 108B, . . . 108N). In some embodiments, the certificate authority (120) may not exist and devices may sign their own certificates.

Figure 2A:
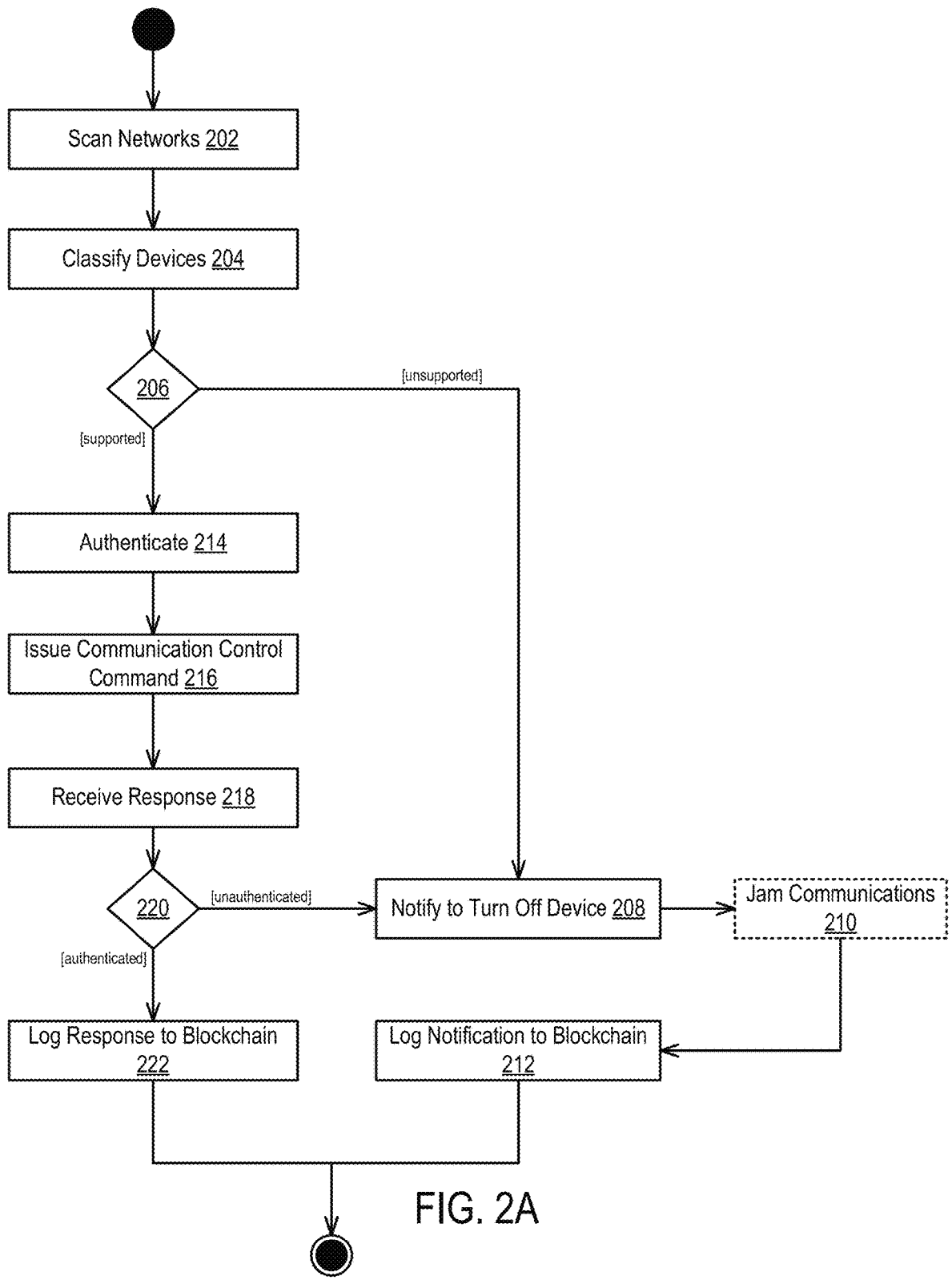
FIG. 2A is a flow diagram illustrating a method for controlling remote devices in a closed area according to some embodiments of the disclosure.

FIG. 2A is a flow diagram illustrating a method for controlling remote devices in a closed area according to some embodiments of the disclosure. In the illustrated embodiment, the method in FIG. 2A may be performed by the aforementioned scanner.

In step 202, the method scans networks.

In one embodiment, the networks include a Bluetooth network, that is, a listing of nearby networks available to connect to via Bluetooth. Alternatively, the method may transmit a broadcast request over a Wi-Fi network or other network to identify devices on the network. As a result, in step 202 the method obtains a listing of devices and network addresses (e.g., IP addresses, MAC addresses, Bluetooth address etc.).

In step 204, the method classifies the devices identified in step 202.

In one embodiment, when a device is detected it may report various properties of the device. For instance, in the Bluetooth scenario, the scanner may establish an insecure socket with the device to control after detecting its Bluetooth address. If the device includes a DICE/RIoT system, it may be configured to broadcast that ability over the insecure channel. For devices that do not include a DICE/RIoT system, the method receives no such indication and classifies the device as an unsupported device.

In step 206, for each device, the method determines if the device is supported or unsupported.

If the device is not supported, the method proceeds to fallback to existing methods of controlling devices. For example, the method may transmit a notification to the device to turn itself off (step 208) or perform some other action. This message may, in turn, be displayed on the device to inform the user of a desired action. Of course, the user may opt to ignore this notification.

In some embodiments, the method may jam communications in addition to notifying the user to turn off the device (step 210). In one embodiment, the jamming of communications may be optional and only employed in specific scenarios.

In step 212, the method then logs the notification sent to the uncontrolled device in a blockchain block. In one embodiment, the method records all messages sent to device, regardless of whether or not the device can or does respond to the message. In this manner, the method maintains a record of the messages sent during operation of the scanner in a secure tamper-proof data structure.

In contrast to the above, if the method determines that the device is classified as a device that supports remote control (e.g., is a device that has a DICE-RIoT subsystem), the method proceeds to authenticate with the device and establish a secure channel (step 214). In one embodiment, this comprises the method transferring identification information to the device and the device acknowledging the identity of the scanner. In one embodiment, the identification information comprises a triple comprising a device identifier, public key, and certificate generated via an $L_1$ DICE-RIoT key generation process (described herein). As used herein layer 0 and 1 are used for authentication while layers 2 and beyond (in both devices) are used for messaging. In one embodiment, the secure channel comprises a TLS connection formed after exchanging keys.

In step 216, after authenticating, the method issues a communication control command.

In one embodiment, the method generates control commands that will result in the device performing an action (e.g., turning off). In one embodiment, these commands are recorded for various device types. In alternative embodiments, these commands may be transmitted to the method by the receiving device. In any event, the method selects the necessary command based on configuration parameters of the device implementing the method.

In one embodiment, the method packs the control instruction into a message and signs the message using its $L_1$ private key. The method then transmits this instruction to the device wherein the device may verify the signature using its $L_2$ public key. In one embodiment, the message additionally includes a freshness value to avoid a replay attack such as a monotonic counter, timestamp etc.

Figure 3:
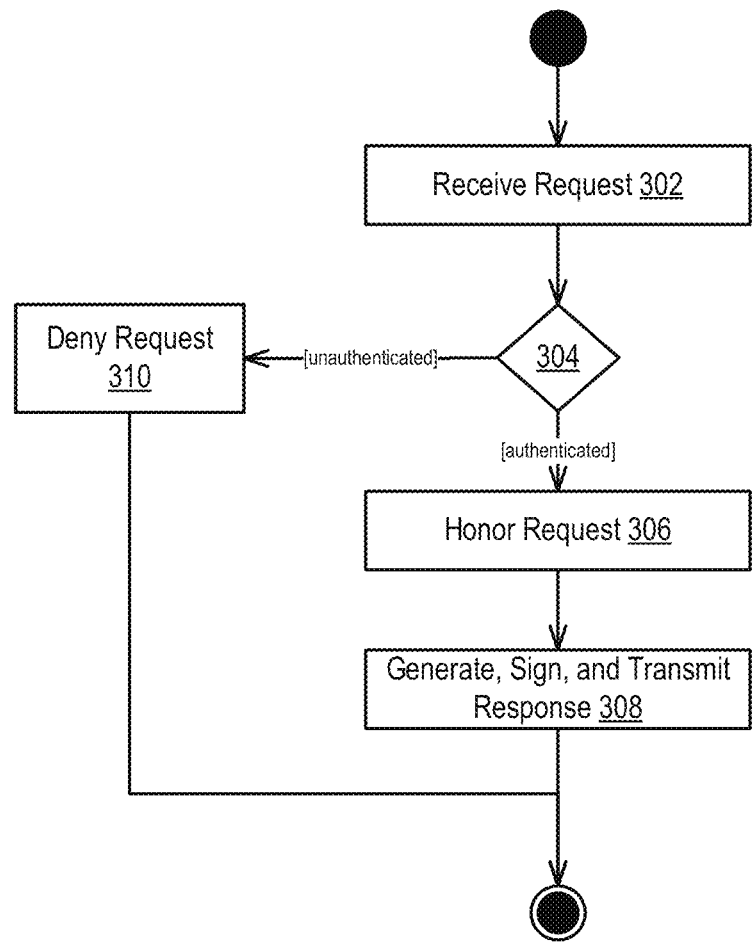
FIG. 3 is a flow diagram illustrating a method for responding to a remote control request according to some embodiments of the disclosure.

After receiving the command, the device executes the command as described in FIG. 3. After executing the command (or if the command is to effect its ability to send a message), the device returns a response to the method (step 218).

In one embodiment, the response may include various data regarding the execution of the order. For example, it may include an explicit acknowledgement of the order, a timestamp of when the order will be executed, a stack trace at the time executed, and any other data related to the order. Similar to the order, the response may be signed using the devices $L_1$ key and verified using the methods $L_2$ key (e.g., a scanners $L_2$ key).

In step 220, the method determines if the response is authentic. In one embodiment, this comprises verifying the signature of the response by using the method's $L_2$ key. Additionally, the method may confirm that the sender's certificate and public identifier are valid.

If the response is not authenticated, the method falls back to existing methods (as described in connection with steps 208-212).

If the response is authenticated, the method logs the response to the blockchain (step 222). Similar to step 212, the scanner logs the order and the response to the blockchain to record the interactions between the devices. In one embodiment, the method may record the order prior to receiving a response. Alternatively, the method may record both records at the same time.

Figure 2B:
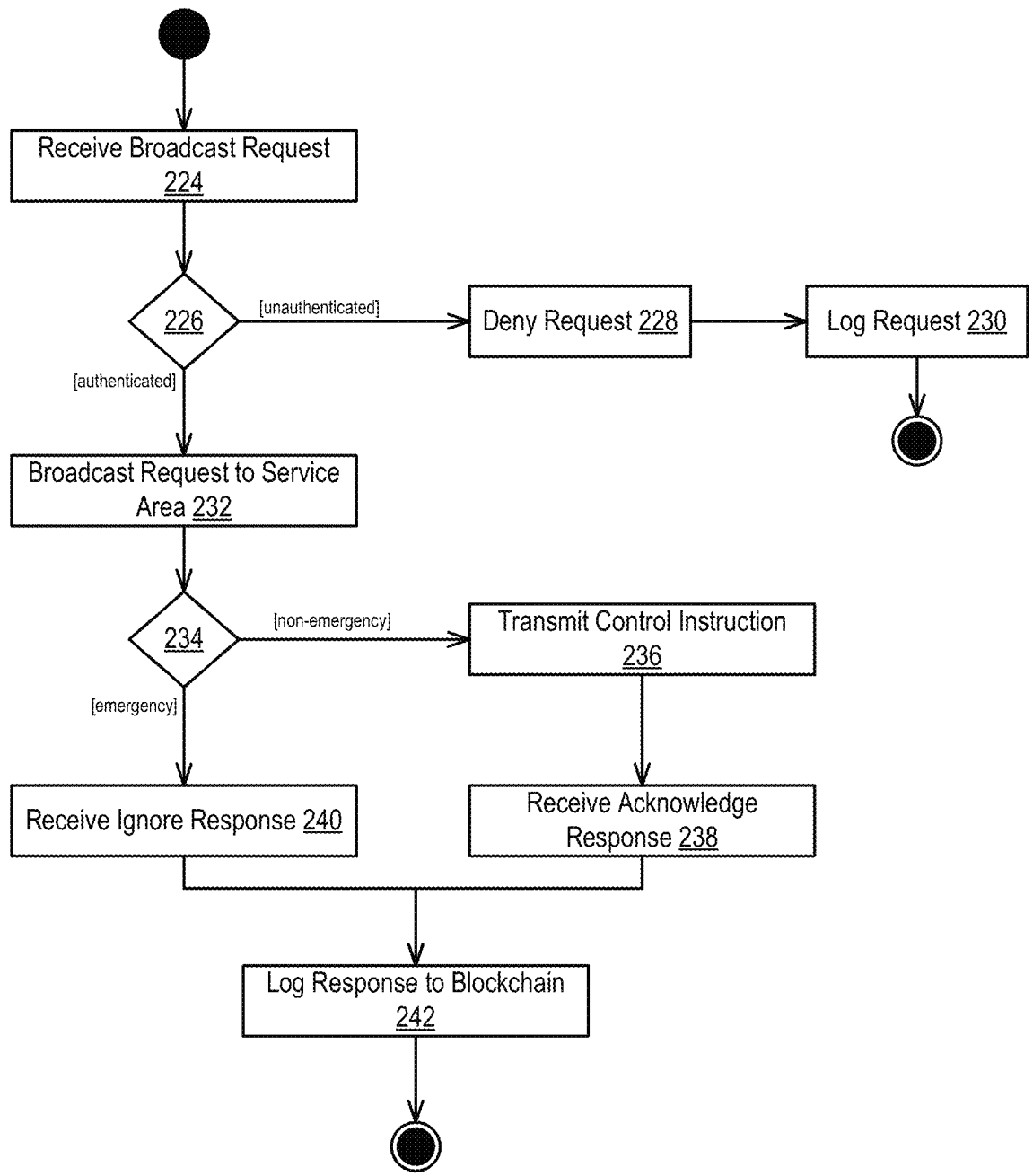
FIG. 2B is a flow diagram illustrating a method for controlling remote devices in an open area according to some embodiments of the disclosure.

FIG. 2B is a flow diagram illustrating a method for controlling remote devices in an open area according to some embodiments of the disclosure.

In step 224, the method receives a broadcast request.

In contrast to the operations in FIG. 2A, the method illustrated in FIG. 2B may be applied to a large geographic area (e.g., a few acres, a city, etc.). In this embodiment, the broadcast request may be issued by an authority (e.g., police). The broadcast request may state that all devices within a defined area perform one or more operations included within the request (e.g., turn off, limit bandwidth).

Since the requests can be sent by any device, and the system makes no assumption about the security of the channel, the method checks to see whether the device transmitting the request is authenticated (step 226). The method may employed a DICE-RIoT certificate check to confirm the identity of the sender (e.g., by doubly-decrypting a triple associated with the sender to confirm their identity).

If the check (step 226) fails, the method denies the request (step 228) and logs the request (230) to a blockchain storage device. In the illustrated embodiment, the method denies the request by simply ignore the request. The method also logs the request for law enforcement or other purposes. In some embodiments, the log includes an identity of the sender (e.g., IP address, etc.) to identify a potentially malicious user.

Alternatively, if the method authenticates the sender the method broadcasts the request to a service area (step 232). This service area may be defined in the broadcast request or may be associated with the device implementing the method itself. In one embodiment, the method re-packs the request and signs the request using its own private key, to ensure security of the message.

In step 234, the method performs separate actions based on the type of receiver. In one embodiment, the method receives an ignore message (step 240) from an emergency vehicle or personnel. For example, if the control instruction is to turn off all cell phones during an emergency (or to limit bandwidth), this control instruction may be ignored by emergency workers and equipment. In step 242, the method logs the response to the blockchain.

Alternatively, for any other devices the method transmits a control instruction (step 236) to those devices and receives acknowledgement responses (step 238). These two steps are fully described in FIG. 2A, and specifically in steps 216, 218, 220, 208, 210, 212, and 222 the disclosure of which is incorporated herein by reference in its entirety.

In one embodiment, step 234 may comprise identifying a list of devices within the service area similar to that described in steps 202 and 204 of FIG. 2A. Notably however, since the service area is bigger, the network scanned may comprise a cellular network area (e.g., one or more areas serviced by a given cell tower). In this example, scanning the network comprises identifying a listing of IP addresses in a given area (e.g., by querying cellular base station equipment).

FIG. 3 is a flow diagram illustrating a method for responding to a remote control request according to some embodiments of the disclosure. In the illustrated embodiment, the method may be performed by a controlled device. Many features of the controlled device have been described from the context of a controlling device and those details are not repeated herein but are incorporated by reference.

In step 302, the method receives a request. As described above, this request comprises a control instruction from a remote device (e.g., a scanner in FIG. 1).

In step 304, the method authenticates the request. As described above, this may comprise verifying a digital signature using an $L_2$ public key.

In step 310, the method denies the request if the signature validation fails and, optionally, transmits a notice to the sender that the device will not honor the request.

In step 306, the method honors the request if the signature validation passes. In this step, the device may perform one or more actions included within the request such as turning off the device, limiting bandwidth, enabling full bandwidth (if the device is a router or other telecommunications equipment), etc.

In step 308, the method generates, signs, and transmits a response.

In one embodiment, the response comprises service information of the request such as a time the request will be fulfilled, what specific actions will be taken etc. The method signs the request using its private key and transmits the response to the sender for recordation in a blockchain, as described above.

Figure 4:
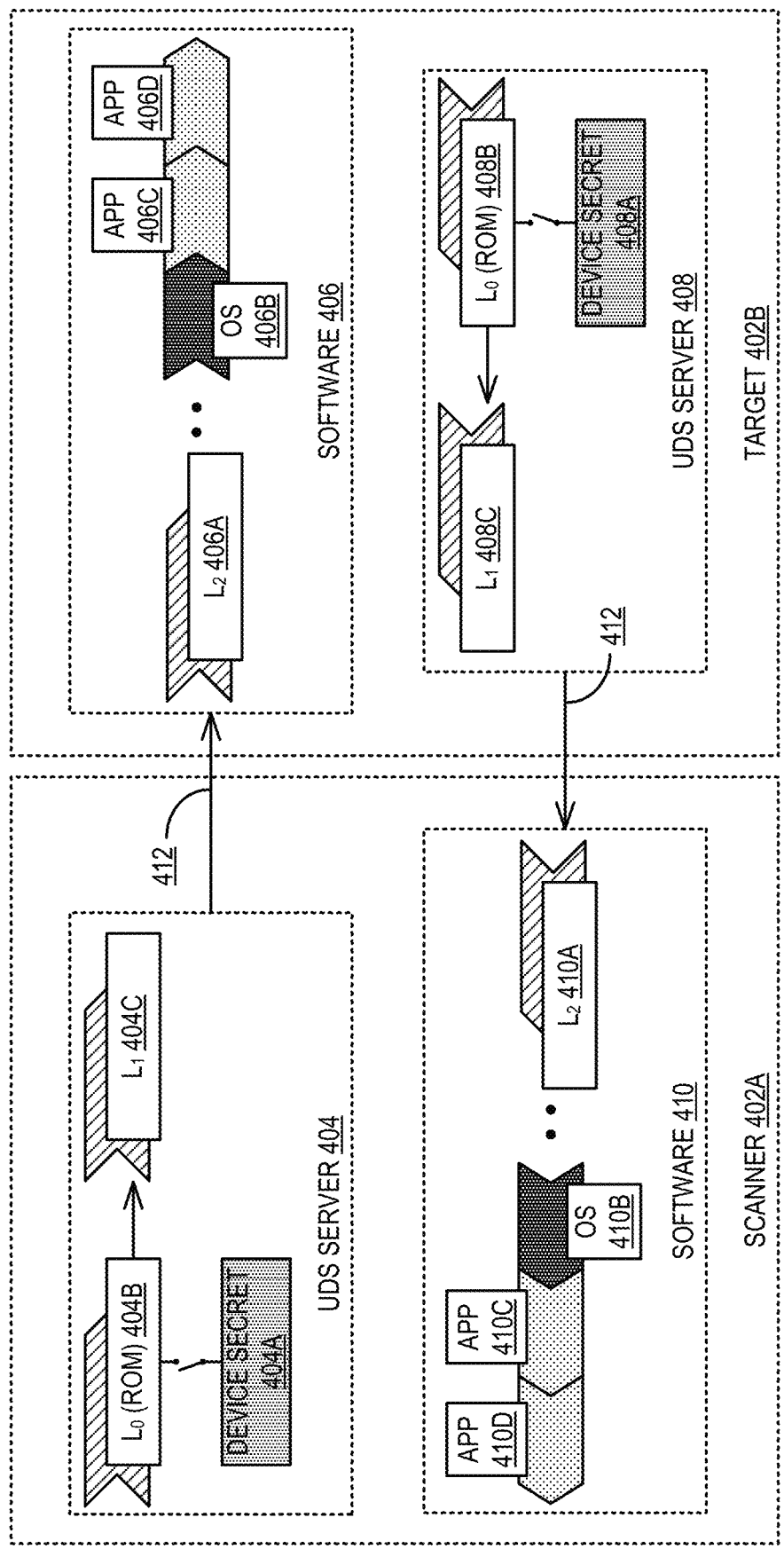
FIG. 4 is a block diagram illustrating a DICE-RIoT communications system according to some embodiments of the disclosure.

FIG. 4 is a block diagram illustrating a DICE-RIoT communications system according to some embodiments of the disclosure.

As illustrated, a scanner (402A) and target (402B) communicate via a bi-directional communications path (412). All communications over path (412) are secured via UDS servers (404, 408) installed within the scanner (402A) and target (402B) respectively. In one embodiment, the UDS servers (404, 408) comprise the same, or similar, hardware devices installed within the scanner (402A) and target (402B). Thus, descriptions of one UDS server are equally applicable to the other unless otherwise distinguished.

Each UDS server has a "device secret" (e.g., 404A, 408A). In the illustrated embodiment, the device secret is known only to the manufacturer of the device and processing core of the server (e.g., $L_0$ ROM 404B, 408B), and is used in the creation of a Compound Device Identifier ("CDI") by the processing core. In one embodiment, the CDI is a set of data used to identify the software running on a system that was used to generate the data.

In one embodiment, the CDI is created using a one-way hash function (denoted as H). First, the UDS server calculates a hash (or other unique measurement of the $L_1$ code 404C). In some embodiments, the UDS server further can utilize the hardware state and configuration data of the device when computing the hash. This hash is appended to the retrieved device secret (e.g., 404A) and input into the one-way hash function to generate the CDI. Access to the device secret (e.g., 404A) is then removed and the contents of the device secret is completely removed from volatile memory. Control of the device is then transferred to the $L_1$ code (404C) (step 420e). In some embodiments, a hash message authentication code (HMAC) function may be used in lieu of a one-way hash function. In this embodiment, the device secret may be used as a key and the hash of the $L_1$ code is used as the message.

The $L_1$ code (404C) receives the CDI and uses the CDI to generate secure keys and certificates to identify the device. Since the CDI is generated using the UDS and hash of the code generating such keys, it ensures authenticity of the generated keys/certificates. After generating the CDI, the $L_1$ code (404C) permanently deletes the CDI from memory, thus preventing leakage of the CDI. In one embodiment, the $L_1$ code (404C) is never modified and thus the CDI remains the same throughout the life of the device providing the $L_1$ code (404C).

A UDS server generates a secure key pair in a DICE-RIoT architecture for use by other layers (e.g., Layer $L_2$ 406A). The UDS server generates an asymmetric DeviceID key pair using the CDI received from the $L_0$ code (discussed supra). In one embodiment, the method uses a deterministic asymmetric key generation algorithm to generate a public and private key, the choice of specific algorithm is not intended to be limiting. The UDS server exports the public portion of the key pair to the next layer of code (e.g., the $L_2$ layer). The UDS server creates a certificate structure containing the public key. The certificate may comprise an X.509-formatted certificate. The UDS server may additionally generate one or more alias keys using the CID and a hash of the next layer of software. For instance, the UDS server can generate the alias keys using the CID and a hash of the $L_2$ software (406A). In one embodiment, a UDS server can query a target device (402B) to request the hash of the $L_2$ code. In other embodiments, the UDS server stores the hash of the $L_2$ code installed during manufacturing or updated out-of-band by a remote service. In one embodiment, the $L_2$ code is associated with specific hardware installed in the target (402B) or scanner (402A) and thus is relatively static and unchanging during the life of the device. For example, a single entity may manufacture the chips associated with the $L_1$ and $L_2$ software, thus the hashes of this code may be well known to the system.

The $L_2$ software may load additional modules, assuming they are authorized by a firmware security descriptor. Eventually, the $L_2$ software (or code loaded by the $L_2$ software) can use the keys and certificates provided by $L_1$ to authenticate itself using Transport Layer Security (TLS). In one embodiment, the $L_2$ software ensures that the software only uses the alias key issued to it. That is, the $L_2$ software should not use an alias credential issued to an earlier firmware version.

The aforementioned process may be repeated throughout the target (402B). That is, the $L_2$ software (406A) generates a new alias key for the next layer, together with an alias certificate that encodes a hash of the layer above. For example, the $L_2$ software (406A) generates an alias key for the OS (406B) using a hash of the OS (406B), the OS (406B) generates an alias key for app (406C) using a hash of the app (406C), etc. The alias certificates issued to the next layers are signed with the alias key granted to the underlying layer (rather than the DeviceID key.) In other words, additional layers serve as additional subordinate certificate authorities. This scheme can be extended all the way to the application layer, where each application gets a unique alias key and certificate that encodes it identity. In these cases, relying parties can walk the alias certificate chain to establish both the identity of the top layer and the identity of all the lower layers that comprise the top layer's trusted computing base.

Notably, in contrast to a traditional use of DICE-RIoT, the illustrated system distributes the layers of the protocol among two or more devices. That is, instead of the $L_2$ software (406A) resident on the scanner, it is resident on the target device and is associated with separate hardware. In the illustrated embodiment, the scanner and target device may only be operating using the DICE-RIoT protocol when in close proximity to one another (i.e., within 100 meters or within Bluetooth® range). The two devices may employ a personal area network (PAN), near-field communication network, or other high-speed ad hoc network to exchange hashes of layers used to generate alias keys in the manner described above. After assigning keys and certificates, these keys and certificates may be used to sign and, in some embodiments, encrypt all future communications between the two devices, ensuring that man-in-the-middle attacks are prevented which would control the target device using a spoofed key.

When messaging, the scanner will generally transmit a message that includes a digital signature generated using the private key of the scanner. Upon receiving this message, the $L_2$ software (406A) can verify the identifying using the scanner certificate received during the process described above. In some embodiments, the message will also be secured against replay attacks. In this embodiment, the $L_2$ software (406A) provides a random string (e.g., a random message) to the $L_1$ code. When signing the message, the $L_1$ code will sign the messaging using both its private key as well as the random message. When verifying, the $L_2$ software (406A) will know the random message and be able to verify that the sender is indeed authorized.

Figure 5:
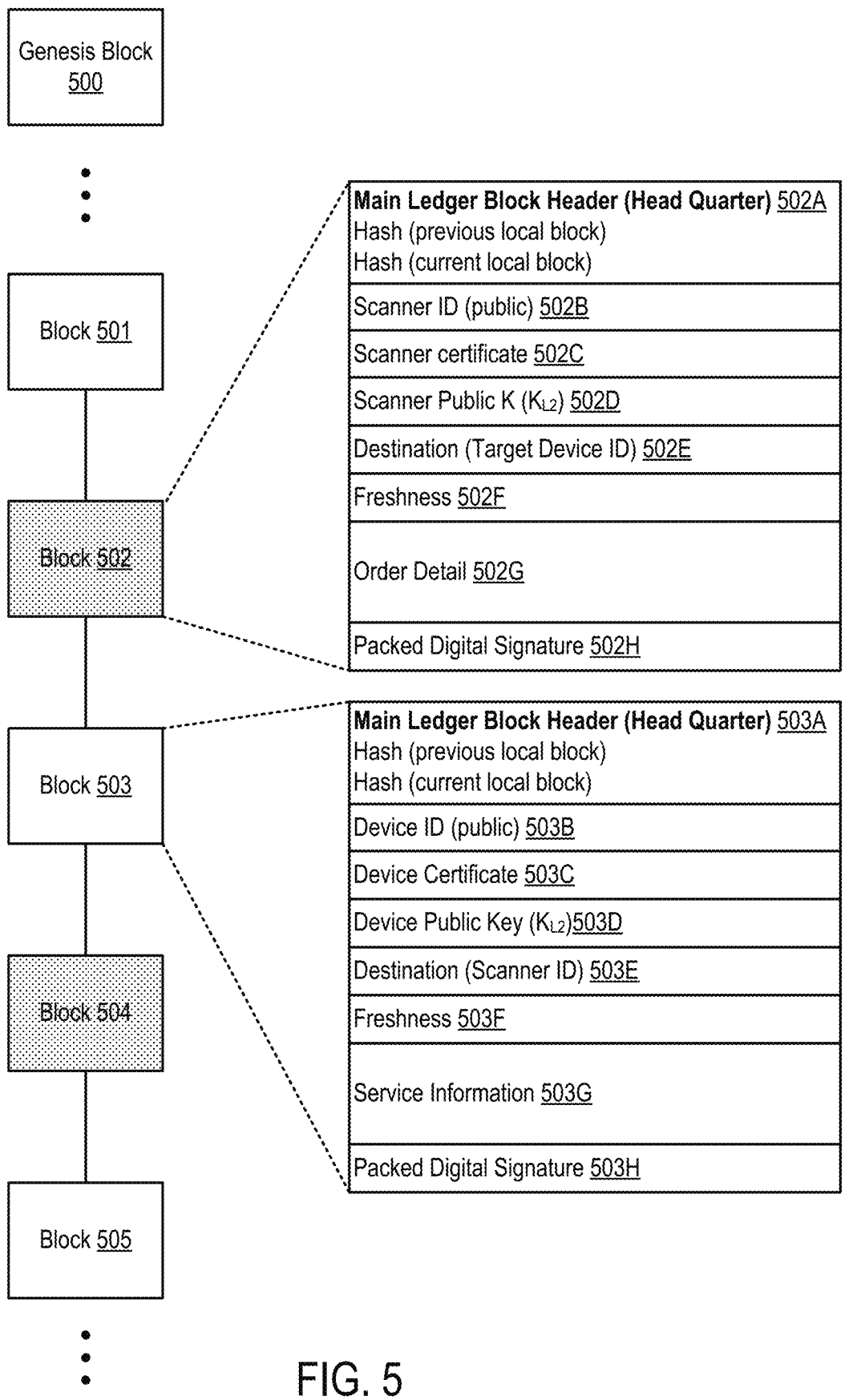
FIG. 5 is a diagram of a blockchain data structure and respective blocks of the structure according to some embodiments of the disclosure.

FIG. 5 is a diagram of a blockchain data structure and respective blocks of the structure according to some embodiments of the disclosure.

In the blockchain illustrated in FIG. 5, a plurality of blocks (501, 502, 503, 504, and 505) are illustrated, as well as a genesis block (500). As is known in the art, a blockchain represents an immutable and cryptographically verified record of transactions or changes in state of data. In the instant application, each time a request to execute and operation (and response thereto), the request and response is recorded to the blockchain. In one embodiment, only scanner devices (or other controlling devices) access the blockchain. In this manner, all requests/responses are verified and recorded for future retrieval if needed. Additionally, the inherent verification of a blockchain ensures that rogue entities cannot maliciously attempt to issue control commands (or erroneously pretend to respond to them). This is ensured due to the use of DICE-RIoT keys as blockchain addresses, since the DICE-RIoT keys cannot be compromised or tampered with.

FIG. 5 additionally illustrates the contents of a block (502) in the chain generated by a controlling device such as a scanner. As illustrated, the block includes a main ledger block header (502A) that includes a hash of the current block and hash of the previous block. The block additionally includes a triple including the scanner ID (502B), the scanner's certificate (502C), and the public key of the scanner (502D) described above. The destination of the request (the "target") device is also recorded (502E). Finally, a freshness field (502F) is included which may comprise a timestamp, monotonic value, or other value.

The block additionally includes order details (502G) which may, optionally, be encrypted. These details include the specific control instructions issued to the target device by the scanner.

Finally, each block is signed by the sender (e.g., the scanner for block 502) and the signature is packed and included in the block as packed digital signature (503H). In the illustrated embodiment, the signature (502H) is signed using the senders private key and is verified by a receiver using the receivers public key.

As illustrated, the chain includes responses such as response block (503). This response block (503) is generated by the scanner, but utilizes the data returned by a controlled device in response to a request. The block (503) is similar to block (502) and many details of block (502) are incorporated by reference in the description of block (503). As with block (502), block (503) includes a header (503A), a freshness value (503F), a triple (503B-503D) and a destination identifier (503E). Notably, the triple and destination identifier refer to the target device and scanner, respectively, the opposite of block (502). Further, block (503) includes service information (503G) which comprises the details of how the target device responded to an order.

In the illustrated embodiments, the methods log data to a blockchain data structure in multiple steps. In each step, as described above, logging data comprises adding a block to the blockchain data structure. In the illustrated embodiments, a block is recognized as part of the blocking (i.e., is included in the ledger) if two conditions are met. First, during insertion, the hash of the previous block must match the hash of the previous block as previously computed. That is, referring to FIG. 5, the "Hash (previous local block)" of header 503A must match "Hash (current local block)" of previous block 502A, before block 503 is inserted. In addition to this requirement, the block must satisfy a second, non-standard condition that the block be generated by an authorized host of the system. This particular requirement is, effectively, an alternative to proof-of-work in traditional blockchain systems (i.e., a mathematical competition among nodes). Specifically, in the illustrated blockchain, the nodes participating in the system attempt to guess the right signature to insert the block in the block chain. However, in the system, one entity in the system owns the private key used to generate the signature and thus can quickly "win" the competition (while the assertion is able to be validated by any other node using the private key owner's public key). In this manner, only the genuine signatory can win the competition, preventing unauthorized entry of blocks into the blockchain.

Figure 6:
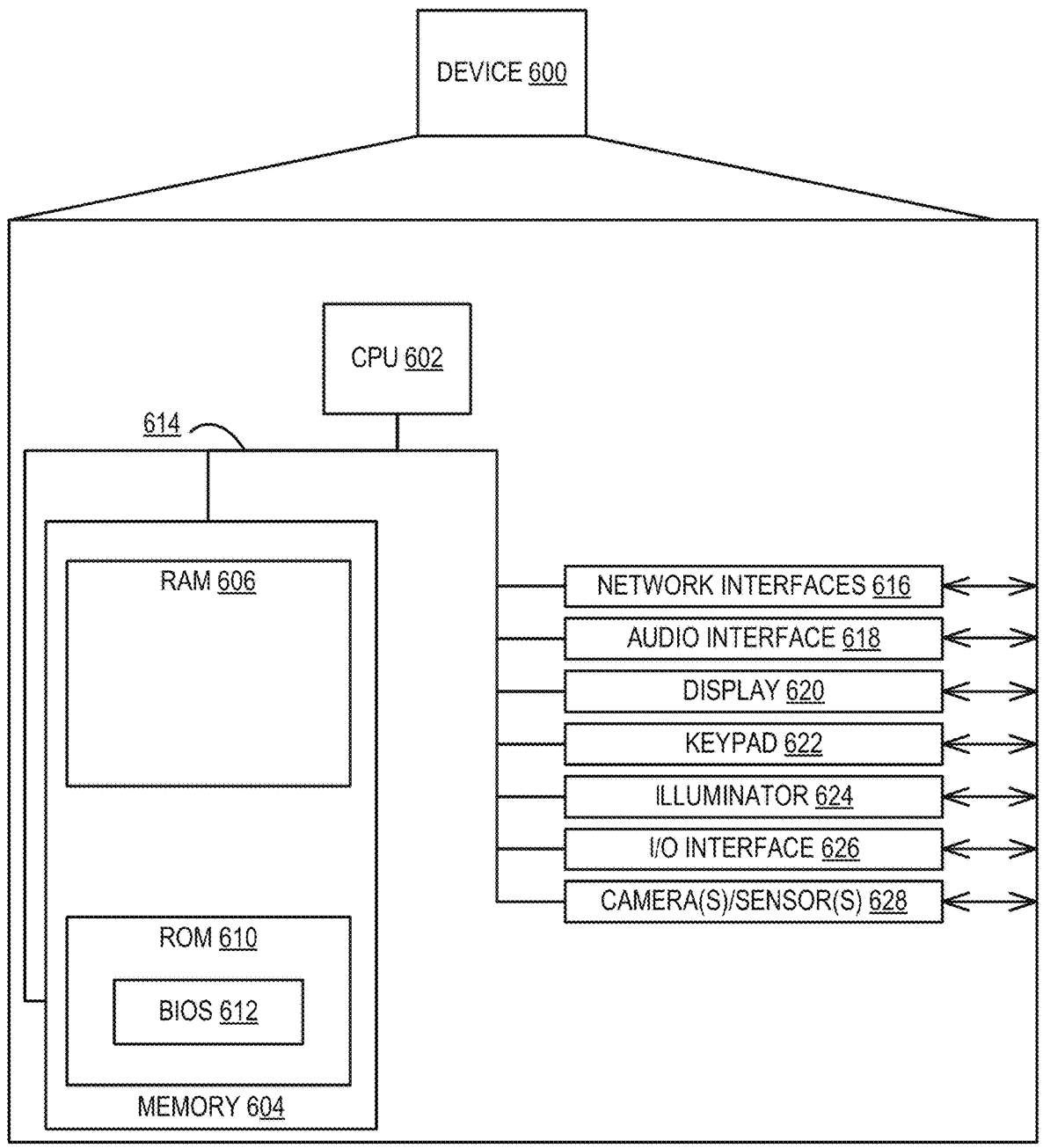
FIG. 6 is a block diagram of a computing device according to some embodiments of the disclosure.

FIG. 6 is a block diagram of a computing device according to some embodiments of the disclosure.

Processing device can include many more or fewer components than those shown in FIG. 6. For example, the aforementioned instances may not require an audio interface, display, keypad, illuminator, or cameras/sensors. However, the components shown are sufficient to disclose an illustrative embodiment for implementing the present disclosure. Further, in some embodiments, the device illustrated in FIG. 6 can be implemented as a virtual machine while in other embodiments the device can be implemented as a physical machine. In some embodiments, the device is implemented as both, with a virtual machine running on the device depicted in FIG. 6.

As shown in FIG. 6, device (600) includes processing units (CPUs) (602) in communication with a mass memory (604) via a bus (614). Device (600) also includes one or more network interfaces (616), an audio interface (618), a display (620), a keypad (622), an illuminator (624), an input/output interface (626), and a camera(s) or other optical, thermal or electromagnetic sensors (628). Device (600) can include one camera/sensor (628), or a plurality of cameras/sensors (628), as understood by those of skill in the art.

Device (600) can optionally communicate with a base station (not shown), or directly with another computing device. Network interface (616) includes circuitry for coupling device (600) to one or more networks and is constructed for use with one or more communication protocols and technologies. Network interface (616) is sometimes known as a transceiver, transceiving device, or network interface card (NIC).

Audio interface (618) is arranged to produce and receive audio signals such as the sound of a human voice. For example, audio interface (618) can be coupled to a speaker and microphone (not shown) to enable telecommunication with others and generate an audio acknowledgment for some action. Display (620) can be a liquid crystal display (LCD), gas plasma, light emitting diode (LED), or any other type of display used with a computing device. Display (620) can also include a touch sensitive screen arranged to receive input from an object such as a stylus or a digit from a human hand.

Keypad (622) can comprise any input device arranged to receive input from a user. For example, keypad (622) can include a push button numeric dial, or a keyboard. Keypad (622) can also include command buttons that are associated with selecting and sending images. Illuminator (624) can provide a status indication and provide light. Illuminator (624) can remain active for specific periods of time or in response to events. For example, when illuminator (624) is active, it can backlight the buttons on keypad (622) and stay on while the device (600) is powered. Also, illuminator (624) can backlight these buttons in various patterns when actions are performed, such as dialing another processing device. Illuminator (624) can also cause light sources positioned within a transparent or translucent case of the device (600) to illuminate in response to actions.

Device (600) also comprises input/output interface (626) for communicating with external devices not shown in FIG. 6. Input/output interface (626) can utilize one or more communication technologies, such as USB, infrared, Bluetooth™, or the like.

Mass memory (604) includes a RAM (606), a ROM (610), and other storage means. Mass memory (604) illustrates another example of computer storage media for storage of information such as computer-readable instructions, data structures, program modules or other data. Mass memory (604) stores a basic input/output system ("BIOS") (612) for controlling low-level operation of processing device (600). The mass memory can also store an operating system for controlling the operation of processing device (600). It will be appreciated that this component can include a general-purpose operating system such as a version of UNIX, or LINUX™, or a specialized client communication operating system such as Windows Client™, or the Symbian® operating system. The operating system can include, or interface with a Java virtual machine module that enables control of hardware components and operating system operations via Java application programs. Memory (604) includes one or more software applications for implementing some or all of the methods described above, with the exception of ROM-based cryptography DICE-RIoT operations described explicitly above (which are performed in ROM (610).

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    issuing a control command to a vehicle over a channel, the control command causing the vehicle to perform an action;
    receiving a response to the control command; and
    logging the response in a blockchain.

2. The method of claim 1, wherein the control command is generated using a Device Identify Composition Engine-Robust Internet of Things (DICE-RIOT) key generation procedure.

3. The method of claim 1, further comprising scanning a network to obtain a list of vehicles on the network, the list of vehicles including the vehicle.

4. The method of claim 1, further comprising establishing the channel by transmitting a triple to the vehicle, the triple including a device identifier, certificate, and public key.

5. The method of claim 1, wherein the control command causes the vehicle to power off.

6. The method of claim 1, further comprising transmitting a notification to uncontrolled vehicles instructing the uncontrolled vehicles to perform an operation.

7. The method of claim 1, wherein logging the response in the blockchain comprises logging a triple of a vehicle generating the control command, a destination public identifier, order information, and a digital signature.

8. A non-transitory computer-readable storage medium for tangibly storing computer program instructions capable of being executed by a computer processor, the computer program instructions defining steps of:
    issuing a control command to a vehicle over a channel, the control command causing the vehicle to perform an action;
    receiving a response to the control command; and
    logging the response in a blockchain.

9. The non-transitory computer-readable storage medium of claim 8, wherein the control command is generated using a Device Identify Composition Engine-Robust Internet of Things (DICE-RIOT) key generation procedure.

10. The non-transitory computer-readable storage medium of claim 8, further comprising scanning a network to obtain a list of vehicles on the network, the list of vehicles including the vehicle.

11. The non-transitory computer-readable storage medium of claim 8, the steps further comprising establishing the channel by transmitting a triple to the vehicle, the triple including a device identifier, certificate, and public key.

12. The non-transitory computer-readable storage medium of claim 8, wherein the control command causes the vehicle to power off.

13. The non-transitory computer-readable storage medium of claim 8, further comprising transmitting a notification to uncontrolled vehicles instructing the uncontrolled vehicles to perform an operation.

14. The non-transitory computer-readable storage medium of claim 8, wherein logging the response in the blockchain comprises logging a triple of a vehicle generating the control command, a destination public identifier, order information, and a digital signature.

15. A device comprising:
a memory; and
a processor configured to:
- issue a control command to a vehicle over a channel, the control command causing the vehicle to perform an action;
- receive a response to the control command; and
- log the response in a blockchain.

16. The device of claim 15, further comprising scanning a network to obtain a list of vehicles on the network, the list of vehicles including the vehicle.

17. The device of claim 15, the processor further configured to establish the channel by transmitting a triple to the vehicle, the triple including a device identifier, certificate, and public key.

18. The device of claim 15, wherein the control command causes the vehicle to power off.

19. The device of claim 15, further comprising transmitting a notification to uncontrolled vehicles instructing the uncontrolled vehicles to perform an operation.

20. The device of claim 15, wherein logging the response in the blockchain comprising logging a triple of a vehicle generating the control command, a destination public identifier, order information, and a digital signature.

* * * * *